No. 855,275. PATENTED MAY 28, 1907.
S. T. BEAL.
ATTACHMENT FOR AUTOMOBILES.
APPLICATION FILED DEC. 26, 1906.
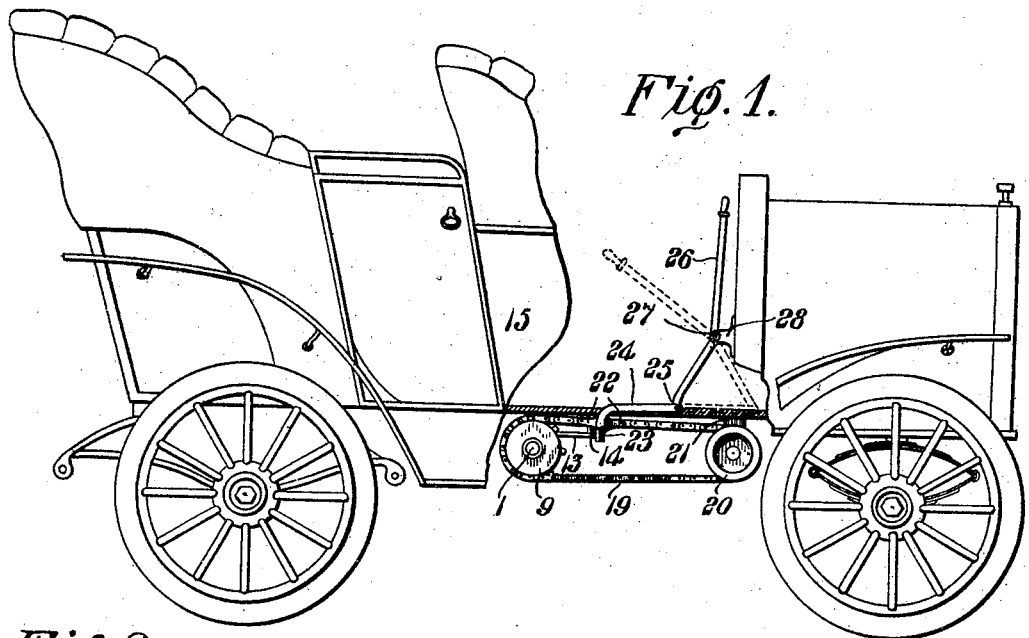
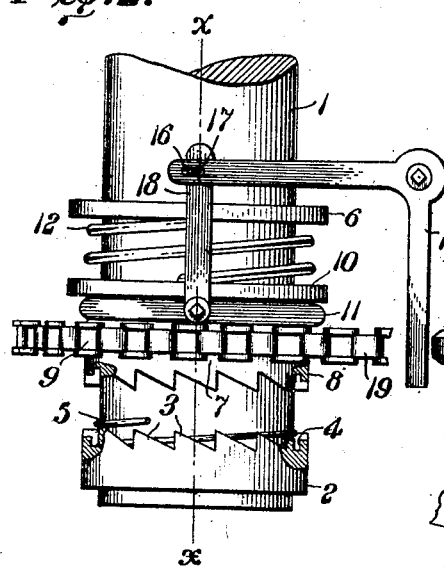
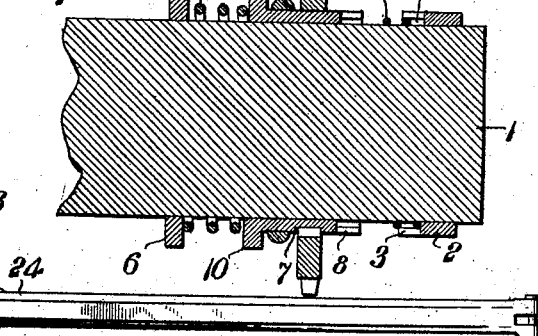
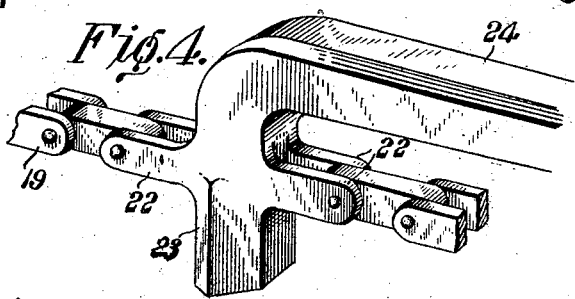
WITNESSES:  Samuel T. Beal, INVENTOR.
By C. A. Snow & Co.
ATTORNEYS

UNITED STATES PATENT OFFICE.

SAMUEL T. BEAL, OF CONWAY SPRINGS, KANSAS.

ATTACHMENT FOR AUTOMOBILES.

No. 855,275.  Specification of Letters Patent.  Patented May 28, 1907.

Application filed December 26, 1906. Serial No. 349,477.

*To all whom it may concern:*

Be it known that I, SAMUEL T. BEAL, a citizen of the United States, residing at Conway Springs, in the county of Sumner and State of Kansas, have invented a new and useful Attachment for Automobiles, of which the following is a specification.

This invention relates to attachments for automobiles and more particularly to means for starting the same.

The object of the invention is to provide simple mechanism whereby the motor may be started without the necessity of the operator leaving the seat and rotating a crank.

A still further object is to provide novel means whereby the starting mechanism may be thrown out of operative relation with the motor shaft immediately subsequent to the starting of the motor.

A still further object is to provide means whereby premature sparking tending to rotate the shaft backward will not injure the apparatus.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of the apparatus in position upon an automobile, a portion of the automobile body being removed; Fig. 2 is a plan view of the clutch mechanism and a portion of the chain of the starting mechanism; Fig. 3 is a section on line $x$—$x$, Fig. 2; and Fig. 4 is a detail view of the connection between the chain and its arm.

Referring to the figures by characters of reference, 1 is the shaft of the motor the same being provided with a collar 2 having its inner face formed with teeth 3, said toothed face constituting one member of a clutch. An annular recess 4 is formed between the teeth and the shaft and seated within this recess is one end of a coiled spring 5 constituting a buffer. Another collar 6 is arranged upon the shaft 1 and a sleeve 7 is loosely mounted on the shaft between the two collars and carries a toothed clutch face 8 adapted to engage the teeth 3. A sprocket 9 is secured on the sleeve 7 and a collar 10 is also formed with said sleeve and forms an annular groove between it and the sprocket within which is loosely mounted a ring 11. A heavy coiled spring 12 surrounds the shaft 1 and bears at its ends upon sleeve 7 and collar 6 serving to hold the two clutch members normally in engagement. A bell crank lever 13 is pivotally mounted upon a bracket 14 extending from the vehicle body 15 and one arm of this lever is slotted as at 16 and engages a pin 17 extending from an arm 18 which is secured to the ring 11.

A chain 19 engages the sprocket 9 and extends around an idler pulley 20 which is supported under the body 15 in any desired manner as by means of a bracket 21. The ends of this chain are pivotally secured between ears 22 which extend in opposite directions from a tripping finger 23. This finger is formed integral with an arm 24 disposed longitudinally above the chain and pivotally connected as at 25 to the lower end of a lever 26. This lever extends in front of the driver's seat and is fulcrumed as at 27 to a bracket 28.

When the lever 26 is in its forward position the tripping finger 23 bears against the bell crank lever 13 so as to cause the slotted end of said lever to pull on the ring 11 and hold the toothed face 8 of sleeve 7 out of engagement with the teeth 3. When the parts are in this position the spring 12 is of course compressed and spring 5 extended. When it is desired to start the motor the operator pulls the lever 26 into position shown by dotted lines in Fig. 1. This will cause the finger 23 to leave the bell crank lever and will at the same time pull chain 19 a sufficient distance to cause the sprocket 9 to make one complete rotation which will be sufficient to start the motor. It is of course apparent that as soon as the bell crank lever 13 is released the spring 12 expands and throws the toothed face 8 into engagement with the teeth 3. The spring 5 acts as a cushion to prevent them from coming together too violently. As soon as the motor has been started the lever 26 is swung back to its normal position as shown in full lines in Fig. 1 thereby returning the chain 19 to its initial position and bringing finger 23 against the bell crank lever 13 so as to retract the sleeve from engagement with the teeth 3. Should premature sparking occur so as to cause the shaft to rotate backward during the starting of the motor in the manner described the finger 23 will be thrown against the bell crank lever 13 so as to disengage the clutch members. It will be seen that this construction is very simple and inexpensive and can be readily attached to any automobile requiring the manual rotation of its motor shaft in order to start the same.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:

1. The combination with a motor shaft and a clutch member rotatable therewith; of a starting device comprising a spring pressed clutch member loosely mounted upon the shaft, and normally engaging the first mentioned clutch member, a lever, a flexible connection between the lever and loose clutch member for rotating said member when the lever is actuated, and means operated by the movement of said lever in an opposite direction for disengaging the clutch members.

2. The combination with the shaft of a motor having a fixed clutch member thereon; of a clutch member loosely mounted on the shaft, resilient means for holding the members normally in engagement, a lever, a flexible connection between the lever and the loose clutch member for rotating said member when the lever is actuated, and means operated by the movement of said lever in the opposite direction for disengaging the clutch members.

3. The combination with a motor shaft having a clutch member rigidly secured thereto; of a clutch member loosely mounted on the shaft, resilient means for holding said member normally in engagement with the fixed clutch member, an actuating lever, means operated by the lever for shifting the movable clutch member from engagement with the fixed clutch member, and a flexible connection between the lever and the loose clutch member for rotating said member when the lever is moved in one direction to release the clutch shifting means.

4. The combination with the shaft of a motor and a clutch member fixed thereon; of a clutch member movably mounted on the shaft, a spring for holding said member normally in engagement with the fixed member, an actuating lever, means operated by the movement of the lever in one direction for shifting and holding the movable clutch member against the tension of the spring, and a flexible connection between the lever and the loose clutch member for rotating said member when the lever is shifted to release the clutch shifting means.

5. The combination with a motor shaft and a clutch member fixedly secured thereon; of a clutch member movably mounted upon the shaft, means for holding said member normally in engagement with the fixed member, a lever, means for transmitting motion from said lever to the movable clutch member, an actuating lever, means operated by the movement of said lever in one direction for actuating the first mentioned lever to disengage the clutch members against the action of the holding means, and means operated by the movement of the lever in the opposite direction for rotating and releasing the movable clutch member.

6. In a starting device for automobiles the combination with a motor shaft and a clutch member rigidly secured thereto; of a clutch member loosely mounted on the shaft, a spring for holding said member normally in engagement with the rigid clutch member, a bell crank lever, a link connection between the lever and movable clutch member, an actuating lever, means operated by said lever when moved in one direction for operating the bell crank lever to tension the spring and disengage the clutch members, and means operated by the movement of the actuating lever in the opposite direction for releasing the bell crank lever and rotating the loose clutch member.

7. In a starting device for automobiles the combination with a motor shaft having a clutch member fixedly secured thereto; of a clutch member loosely mounted on the shaft, a spring for holding the clutch member normally in engagement with the fixed member, a sprocket carried by the loose clutch member, a chain extending therearound, an actuating lever, a connection between said lever and the chain, and means operated by the movement of the chain in one direction for rotating the sprocket and disengaging the clutch members, and by the movement of the chain in the opposite direction for rotating the sprocket and permitting the clutch members to re-engage.

8. In a starting device for automobiles the combination with a motor shaft and a clutch member rigidly secured thereto; of a clutch member loosely mounted upon said shaft, a spring for holding the members normally in engagement, a sprocket carried by the movable member, a chain engaging the sprocket, a bell crank lever, a connection between said lever and the movable member, means carried by the chain for actuating the bell crank lever to move the movable member against the tension of the spring to disengage said members, and a lever for actuating the chain to rotate and reciprocate the movable clutch member.

9. In a starting attachment for automobiles the combination with a motor shaft and a clutch member rigidly connected thereto; of a clutch member loosely mounted upon the shaft, a resilient buffer interposed between said members, a spring for holding the members normally in engagement, a bell crank lever, a connection between said lever and the clutch members, an actuating lever, and means operated by the actuating lever for actuating the bell crank lever and rotating the movable clutch member.

10. In a starting attachment for automobiles the combination with a motor shaft having a clutch member rigidly mounted thereon; of a clutch member loosely mounted on said shaft, a spring for holding the members normally in engagement, a sprocket carried by the movable clutch member, a bell crank lever connected to the movable member, a chain mounted on the sprocket, an actuating lever, an arm connecting said lever and the chain, and a finger depending from the arm and adapted to abut against and actuate the bell crank lever.

In testimony that I claim the foregoing as my own, I have hereto affixed my signature in the presence of two witnesses.

SAMUEL T. BEAL.

Witnesses:
  G. R. PERKINS,
  H. F. LANE.